F. MacINDOE.
MEANS FOR LUBRICATING ELEVATOR GUIDE RAILS.
APPLICATION FILED FEB. 12, 1908.

905,724.

Patented Dec. 1, 1908.

WITNESSES:

INVENTOR
Franklin MacIndoe
BY
Chas. A. Rutter
ATTORNEY

UNITED STATES PATENT OFFICE.

FRANKLIN MacINDOE, OF PHILADELPHIA, PENNSYLVANIA, ASSIGNOR OF ONE-THIRD TO THOMAS DUNCAN JUST AND ONE-THIRD TO PETER T. McGLYNN, OF PHILADELPHIA, PENNSYLVANIA.

MEANS FOR LUBRICATING ELEVATOR GUIDE-RAILS.

No. 905,724.     Specification of Letters Patent.     Patented Dec. 1, 1908.

Application filed February 12, 1908. Serial No. 415,515.

*To all whom it may concern:*

Be it known that I, FRANKLIN MACINDOE, a citizen of the United States, and a resident of the city and county of Philadelphia, State of Pennsylvania, have invented certain new and useful Improvements in Means for Lubricating Elevator Guide - Rails, of which the following is a specification.

My invention relates to improvements in devices for lubricating the guide-rails of elevators, and the object of my invention is to furnish an automatically operating device, carried by and moving with the elevator car or cage, for supplying grease as needed to the guide-rails which direct the car or cage during its movements.

Figure 2:
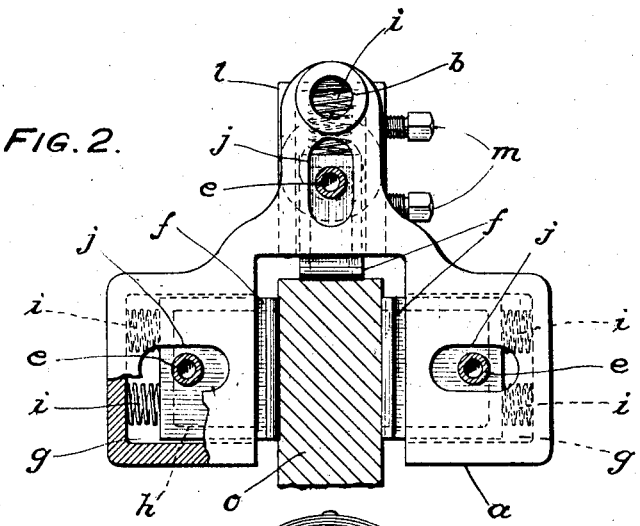
Figure 1:
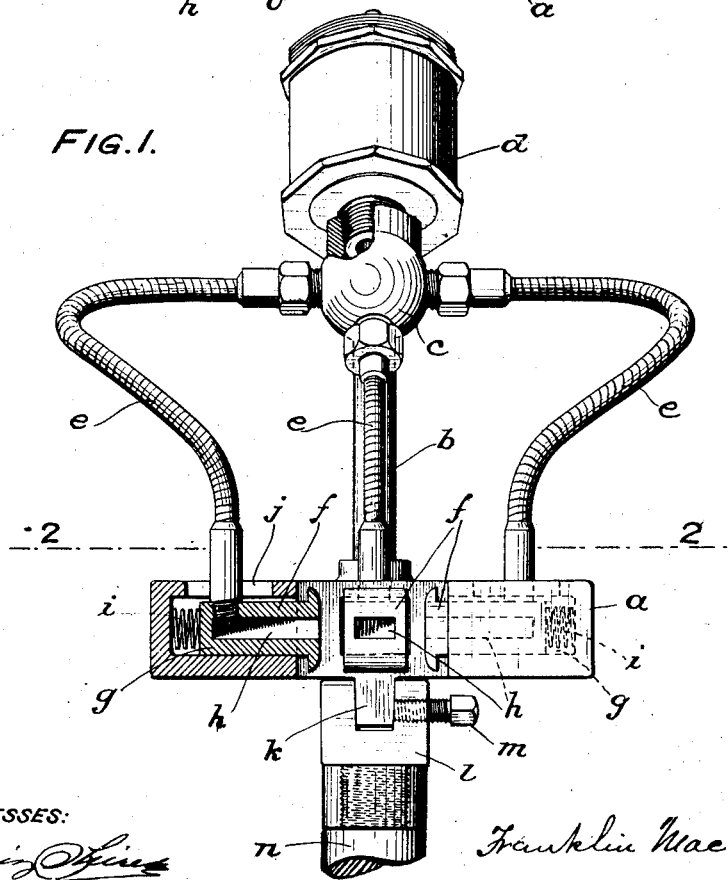

In the accompanying drawings, in which similar letters of reference indicate similar parts throughout the several views:—Figure 1, is a front elevation of my elevator guide-rail lubricating device, one of the grease distributers and its holder being shown in section, Fig. 2, a section of Fig. 1 on line 2—2, part of one of the grease distributer holders being broken away.

$a$ is a frame which is carried by the elevator cage and which may itself form the guide which engages the guide rail or which may be separate from the guide. The frame $a$ carries a standard $b$ which carries a grease distributing chamber $c$ which carries a compression grease cup $d$ of any suitable pattern. From the distributing chamber $c$ lead as many grease conduits $e$ as there may be grease distributers $f$, in the present case three. The conduits $e$ are preferably formed of flexible metallic tubing but they might be formed of any other suitable flexible tubing to accommodate the movements of the grease distributers $f$ in their holders. There should be as many grease distributers as there are sides of the guide-rail engaged by the guide or guides carried by the elevator car or cage. The usual practice is to have the latter engage three sides of the guide-rail. I have shown three grease distributers, two of which are adapted to engage and lubricate opposite sides of the rail, and the third to lubricate its front.

The grease distributers $f$ are carried in holders $g$ formed in the plate $a$; they are cored out, as at $h$; their faces are flat so as to bear against the guide rail, and the upper and lower edges of their faces are rounded off as shown so that they may easily pass over any irregularities or splices that may be in the rail. The conduits $e$ leading from the grease distributing chamber to the distributers $f$ are secured to the latter and discharge their contents into the distributers, the grease being forced through by the spring or other means with which the cup $d$ is furnished for this purpose.

A spring or springs $i$ forces the face of the distributer $f$ against the guide rail, and in order that there shall not be too much grease fed from the distributer to the rails the springs $i$ should be sufficiently strong to prevent the column of grease in the conduits $e$ and distributers $f$ from engaging the guide rail and forcing the distributers backwards, in other words the pressure exerted by the springs $i$ is slightly in excess of the compression pressure of the grease cup, this arrangement, while assuring an ample supply of grease for lubrication, effectually prevents a wasteful use, in fact there is no appreciable feeding of grease upon a well lubricated guide as the grease thereon acts to seal the grease outlet in the distributers, but a part of the guide not lubricated acts to frictionally withdraw a small amount of grease out of the distributer as it passes.

In order to attach the grease conduits $e$ to the distributers $f$ and to permit the former to follow the movements of the latter the frame $a$ is perforated as shown at $j$.

For purposes of adjustment the frame $a$ may be furnished with a tongue $k$, which is carried by a bifurcated cap $l$ adapted to be screwed to a post or rod $n$. Set screws $m$ carried by cap $l$ engage the tongue $k$ and hold it in any desired position in the cap. A rotary adjustment may be made, if required, by turning the threaded cap as required upon its supporting post.

$o$, Fig. 1, shows a transverse section through one of the guide rails for the elevator and the manner in which its sides are engaged by the grease distributers.

Having thus described my invention I claim as new and desire to secure by Letters Patent:—

1. In a device for lubricating the guide-rails of an elevator car, in combination, a frame, grease distributers carried by said frame adapted to engage said guide-rails, a compression grease cup, and flexible conduits connecting said grease cup and grease distributers.

2. In a device for lubricating the guide-rails of an elevator car, in combination, a frame, grease distributers carried by said frame, springs for holding said distributers in contact with said guide-rails, a compression grease cup, and means for conveying grease from said cup to said distributers, the pressure exerted upon said distributers by said springs being somewhat in excess of the compression pressure of said cup.

3. In a device of the character described in combination, a frame furnished with perforated holders, grease distributers carried in said holders, springs for holding said distributers in contact with the guide-rails of the car, a standard carried by said frame, a grease distributing chamber carried by said standard, flexible conduits connecting said grease distributing chamber and said distributers, and means for supplying grease under pressure to said grease distributing chamber.

FRANKLIN MacINDOE.

Witnesses:
CHARLES A. RUTTER,
J. CRAIG SHIREDY.